United States Patent
Nii et al.

(10) Patent No.: US 10,988,606 B2
(45) Date of Patent: Apr. 27, 2021

(54) MODIFIED VINYL ALCOHOL POLYMER POWDER HAVING REDUCED METHANOL CONTENT AND PRODUCTION METHOD THEREFOR, AND WATER-SOLUBLE FILM AND PACKAGING MATERIAL

(71) Applicant: KURARAY CO., LTD., Kurashiki (JP)

(72) Inventors: Shinsuke Nii, Kurashiki (JP); Yosuke Kumaki, Kurashiki (JP); Junpei Horiguchi, Tainai (JP); Tadahito Fukuhara, Kurashiki (JP); Tatsuya Tanida, Tainai (JP)

(73) Assignee: KURARAY CO., LTD., Kurashiki (JP)

( * ) Notice: Subject to any disclaimer, the term of this patent is extended or adjusted under 35 U.S.C. 154(b) by 81 days.

(21) Appl. No.: 16/337,224

(22) PCT Filed: Apr. 13, 2017

(86) PCT No.: PCT/JP2017/015126
§ 371 (c)(1),
(2) Date: Mar. 27, 2019

(87) PCT Pub. No.: WO2018/061272
PCT Pub. Date: Apr. 5, 2018

(65) Prior Publication Data
US 2019/0300693 A1  Oct. 3, 2019

(30) Foreign Application Priority Data

Sep. 28, 2016 (JP) ............................. JP2016-190133

(51) Int. Cl.
| | |
|---|---|
| *C08L 29/04* | (2006.01) |
| *C08F 8/12* | (2006.01) |
| *C08F 216/06* | (2006.01) |
| *C08F 222/10* | (2006.01) |
| *C08K 5/00* | (2006.01) |
| *C08F 222/00* | (2006.01) |
| *C08F 8/16* | (2006.01) |

(52) U.S. Cl.
CPC ................ *C08L 29/04* (2013.01); *C08F 8/12* (2013.01); *C08F 8/16* (2013.01); *C08F 216/06* (2013.01); *C08F 222/00* (2013.01); *C08F 222/10* (2013.01); *C08K 5/0016* (2013.01); *C08L 2203/16* (2013.01)

(58) Field of Classification Search
CPC .... C08F 222/00; C08F 222/10; C08F 216/06; C08L 29/04; C08J 2329/04
See application file for complete search history.

(56) References Cited

U.S. PATENT DOCUMENTS

| | | | | |
|---|---|---|---|---|
| 5,728,788 | A * | 3/1998 | Takachi | .................. C08F 18/08 526/216 |
| 2015/0376556 | A1* | 12/2015 | Ohtani | ................. C11D 17/045 510/386 |
| 2016/0326285 | A1 | 11/2016 | Mori et al. | |
| 2017/0275394 | A1 | 9/2017 | Mori et al. | |
| 2017/0298216 | A1* | 10/2017 | Labeque | ................... B65B 1/02 |

FOREIGN PATENT DOCUMENTS

| | | |
|---|---|---|
| JP | 52-17070 | 5/1977 |
| JP | 9-302024 A | 11/1997 |
| JP | 2000-351853 A | 12/2000 |
| JP | 2013-28712 A | 2/2013 |
| JP | 2014-101504 A | 6/2014 |
| WO | WO 2015/098979 A1 | 7/2015 |
| WO | WO 2016/047126 A1 | 3/2016 |

OTHER PUBLICATIONS

International Search Report dated Jun. 20, 2017 in PCT/JP2017/015126 filed Apr. 13, 2017.
Moritani, T. et al., "Functional modification of poly (vinyl alcohol) by copolymerization: 1. Modification with carboxylic monomers," Polymer, vol. 38, No. 12, 1997, pp. 2933-2945.

* cited by examiner

Primary Examiner — Jeffrey C Mullis
(74) Attorney, Agent, or Firm — Oblon, McClelland, Maier & Neustadt, L.L.P.

(57) ABSTRACT

A modified vinyl alcohol polymer powder having a structural unit derived from a derivative of an ethylenically unsaturated dicarboxylic acid, and containing a reduced amount of methanol, and a trace amount of a component that does not dissolve in water. The present invention relates to a modified vinyl alcohol polymer powder containing a structural unit derived from a derivative (A) of an ethylenically unsaturated dicarboxylic acid in a content (X) of 0.05 mol % or more and 10 mol % or less, and having a degree of saponification of 80.0 mol % or more and 99.9 mol % or less, the modified vinyl alcohol polymer powder has a methanol content of 0.01 weight % or more and less than 3.0 weight %, the modified vinyl alcohol polymer powder contains 0.1 ppm or more and less than 2,000 ppm of a component that is insoluble in a 90° C., 5 weight % aqueous solution.

14 Claims, No Drawings

MODIFIED VINYL ALCOHOL POLYMER POWDER HAVING REDUCED METHANOL CONTENT AND PRODUCTION METHOD THEREFOR, AND WATER-SOLUBLE FILM AND PACKAGING MATERIAL

TECHNICAL FIELD

The present invention relates to a modified vinyl alcohol polymer powder (hereinafter, also referred to simply as "modified PVA powder") containing a predetermined amount of a structural unit derived from a derivative of an ethylenically unsaturated dicarboxylic acid, and having a degree of saponification of from 80.0 mol % to 99.9 mol %, and in which the methanol content is less than a predetermined amount, and the amount of insoluble components of when the polymer powder is dissolved in water is less than a predetermined amount. The invention also relates to a method of production of such a modified PVA powder. The present invention also relates to a water-soluble film and a packaging material using the modified PVA powder.

BACKGROUND ART

Vinyl alcohol polymer (hereinafter, also referred to simply as "PVA") is a known water-soluble synthetic polymer. It is used as a raw material of vinylon, a synthetic fiber, and in a wide range of other applications, including papermaking, textiles, adhesives, stabilizers for emulsion polymerization and suspension polymerization, inorganic binders, and films.

Particularly, by taking advantage of the reactivity of carboxylic acid, PVAs containing carboxylic acid or a group derived from a derivative of carboxylic acid have been used in applications such as sizing agents used for acid paper containing aluminum sulfate, and waterproof coatings produced by mixing a crosslinking agent with polyvinyl alcohol. Such PVAs are also industrially useful as packaging films for agrichemicals, laundry detergents, and industrial chemicals, and are widely used in these applications by taking advantage of the water-soluble property of carboxylic acid and derivatives of carboxylic acid.

In order to introduce carboxylic acid or a group derived from a derivative of carboxylic acid into PVA, for example, a vinyl ester monomer is copolymerized with a monomer containing carboxylic acid or a derivative of carboxylic acid, and the resulting copolymer is saponified. Derivatives of ethylenically unsaturated dicarboxylic acids have high reactivity with vinyl ester monomers, and are used for efficient introduction of carboxylic acid or a group derived from a derivative of carboxylic acid. To this end, derivatives of maleic acid and fumaric acid are known to be used for their easy availability in industry. However, because ethylenically unsaturated dicarboxylic acids such as maleic acid and fumaric acid have poor solubility for vinyl ester monomers, monomers having improved solubility for vinyl ester monomers are used in solution polymerization. Specifically, monoesters, diesters, or anhydrides of ethylenically unsaturated dicarboxylic acids are used in solution polymerization.

PVA production typically involves saponification in the presence of an alkali catalyst added to a methanol solution of vinyl acetate polymer obtained through radical polymerization of vinyl acetate in methanol solvent, and, accordingly, the resulting PVA powder obtained upon drying inherently contains residual methanol from the solvent. The methanol remaining in the PVA powder is released from the powder upon dissolving the PVA in water, and the released methanol usually becomes directly released into the atmosphere.

From the viewpoint of reducing release of the organic volatile component into the atmosphere, there is a need to reduce the residual methanol in a PVA powder, and various heating and drying techniques are available that are intended to achieve a methanol content of less than 3 weight %, or even less than 1 weight % (Patent Literature 1 to 3).

Patent Literature 1 and 2 disclose a technique that supplies a hydrous gas during drying to replace the organic volatile component in a PVA powder with moisture, and thereby efficiently remove the organic volatile component. However, a modified PVA containing a structural unit derived from monoesters, diesters, or anhydrides of ethylenically unsaturated dicarboxylic acids has high affinity and high solubility for water, and supplying a hydrous gas causes the powder particles to dissolve on powder surfaces, and form blocks by fusing one another in the process of drying. This makes it difficult to run the modified PVA through the organic volatile component removal process, and the technique is not easily applicable to the modified PVA.

Patent Literature 3 proposes a technique whereby PVA is washed with a washing solution of primarily C2 to C3 alcohol to efficiently reduce the methanol content. However, the use of an alcohol of 2 to 3 carbon atoms, which has a higher boiling point and a higher latent heat of vaporization than methanol, requires a larger amount of heat and a longer time for drying than normally required, and involves some industrial issues, including high manufacturing costs.

In normal situations, methanol can be removed by prolonged heating and drying under high temperature, without using a drying technique such as above. However, such procedures consume large energy, and suffer from poor efficiency in industrial production. Another issue is the difficulty in selecting high-temperature drying conditions for a modified PVA containing a structural unit derived from derivatives of ethylenically unsaturated dicarboxylic acids (for example, monoesters, diesters, or anhydrides) because, as described in Non Patent Literature 1, a water-insoluble component occurs as a result of a crosslinking reaction that takes place between the structural moiety derived from the monoester, diester, or anhydride and the hydroxyl moiety of PVA under high temperature. That is, it is considered difficult, if possible, to reduce generation of a water-insoluble component in a modified PVA while achieving a methanol content of less than 3 weight %. Because of such properties of a modified PVA, the method of Patent Literature 3 is also not easily applicable because the technique requires a larger than normal amount of heat and time for drying. In molding PVA into a product such as a film, the water-insoluble component becomes an initiation point of cracking, and the percentage yield of the product film decreases. The water-insoluble component also causes clogging in, for example, a strainer when the PVA is used in the form of an aqueous solution. Indeed, the content of the water-insoluble component needs to be reduced.

CITATION LIST

Patent Literature

Patent Literature 1: JP 52(1977)-17070 B
Patent Literature 2: JP 09(1997)-302024 A
Patent Literature 3: JP 2013-28712 A Non Patent Literature Non Patent Literature 1: Polymer, Vol. 38, No. 12, pp. 2933-2945, 1997

SUMMARY OF INVENTION

Technical Problem

It is an object of the present invention to provide an environmentally-friendly and industrially-useful modified PVA powder having a structural unit derived from a derivative of an ethylenically unsaturated dicarboxylic acid, and containing a reduced amount of methanol, and a trace amount of a component that does not dissolve in water when the powder is dissolved in water. The invention is also intended to provide a method of production of such a modified PVA powder. Another object of the present invention is to provide a water-soluble film and a packaging material using the modified PVA powder.

Solution to Problem

The present inventors conducted intensive studies to find a solution to the foregoing problems, and found that a modified PVA powder having a methanol content of less than 3.0 weight %, and containing less than 2,000 ppm of a component that does not dissolve in water when the powder is dissolved in water is achievable by using ingenuity to the particle diameter of the modified PVA powder or to pre-drying washing conditions, even when a structural unit derived from derivatives of ethylenically unsaturated dicarboxylic acids is introduced. The present invention was completed after further studies based on this finding.

Specifically, the present invention relates to the following.

[1] A modified vinyl alcohol polymer powder containing a structural unit derived from a derivative (A) of an ethylenically unsaturated dicarboxylic acid in a content (X) of 0.05 mol % or more and 10 mol % or less, and having a degree of saponification of 80.0 mol % or more and 99.9 mol % or less, the modified vinyl alcohol polymer powder having a methanol content of 0.01 weight % or more and less than 3.0 weight % as measured by headspace gas chromatography of 500 mg of the polymer powder, the modified vinyl alcohol polymer powder containing 0.1 ppm or more and less than 2,000 ppm of a component that is insoluble in a 90° C., 5 weight % aqueous solution.

[2] The modified vinyl alcohol polymer powder of item [1], wherein the derivative (A) of an ethylenically unsaturated dicarboxylic acid is a monoester, a diester, or an anhydride of an ethylenically unsaturated dicarboxylic acid.

[3] The modified vinyl alcohol polymer powder of item [1] or [2], wherein the derivative (A) of an ethylenically unsaturated dicarboxylic acid includes a maleic acid monoalkyl ester, a maleic acid dialkyl ester, maleic anhydride, a fumaric acid monoalkyl ester, or a fumaric acid dialkyl ester.

[4] The modified vinyl alcohol polymer powder of any one of items [1] to [3], wherein at least a part of the structural unit derived from the derivative (A) of an ethylenically unsaturated dicarboxylic acid is a structural unit represented by the following formula (I),

[Chem. 1]

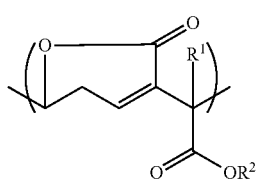

(I)

wherein $R^1$ is a hydrogen atom, or a linear or branched alkyl group of 1 to 8 carbon atoms, and $R^2$ is a metal atom, a hydrogen atom, or a linear or branched alkyl group of 1 to 8 carbon atoms, and the modified vinyl alcohol polymer powder satisfies the following formula (Q), $$0.05 \leq Y/X < 0.98 \qquad (Q),$$

wherein X is the content of the structural unit derived from the derivative (A) of an ethylenically unsaturated dicarboxylic acid, and Y is the content of the structural unit represented by formula (I).

[5] The modified vinyl alcohol polymer powder of any one of items [1] to [4], wherein at least 95 weight % of all particles of the modified vinyl alcohol polymer powder pass through a sieve with 1.00 mm-openings.

[6] The modified vinyl alcohol polymer powder of any one of items [1] to [5], wherein at least 30 weight % of all particles of the modified vinyl alcohol polymer powder pass through a sieve with 500 μm-openings.

[7] A method for producing the modified vinyl alcohol polymer powder of any one of items [1] to [6], the method including the steps of:

obtaining a vinyl ester copolymer (C) through copolymerization of the derivative (A) of an ethylenically unsaturated dicarboxylic acid with a vinyl ester monomer (B);

saponifying the vinyl ester copolymer (C) with an alkali catalyst in a methanol solvent; and impregnating the saponified polymer with a washing solution containing 45 volume % or more of methyl acetate.

[8] The method of item [7], wherein a solution prepared to contain more than 20 weight % of the vinyl ester copolymer (C) is mixed with the alkali catalyst in the saponification step, and a resulting semi-solid or solid product is pulverized with a pulverizer.

[9] The method according to item [7] or [8], wherein the saponification step does not involve neutralization with an acid.

[10] A method for producing the modified vinyl alcohol polymer powder of any one of items [1] to [6], the method including:

obtaining a vinyl ester copolymer (C) through copolymerization of the derivative (A) of an ethylenically unsaturated dicarboxylic acid with a vinyl ester monomer (B); and saponifying the vinyl ester copolymer (C) with an alkali catalyst in a methanol solvent, the vinyl ester copolymer (C) having a concentration of less than 10 weight % in the methanol solvent in the saponification step.

[11] A water-soluble film containing the modified vinyl alcohol polymer powder of any one of items [1] to [6].

[12] The water-soluble film of item [11], wherein the water-soluble film further contains a plasticizer.

[13] The water-soluble film of item [11] or [12], wherein the water-soluble film further contains a surfactant.

[14] A packaging material containing a chemical packed in the water-soluble film of any one of items [11] to [13].

[15] The packaging material of item [14], wherein the chemical is an agrichemical or a detergent.

Advantageous Effects of Invention

A modified vinyl alcohol polymer powder (hereinafter, also referred to as "modified PVA powder") of the present invention has a methanol content of less than 3.0 weight % even after the introduction of a structural unit derived from a derivative (A) of an ethylenically unsaturated dicarboxylic acid, and, accordingly, the amount of organic volatile component discharge is small during use. The modified vinyl alcohol polymer powder also contains less than 2,000 ppm of components that are insoluble in a 90° C., 5 weight % aqueous solution, and can preferably be used as a paper coating agent, a waterproof composition, or a packaging material for various chemicals such as agrichemicals and laundry detergents, without causing problems such as filter clogging. Water-soluble films and packaging materials using a modified PVA powder of the present invention do not easily produce a pinhole, and a packaging material with a desirable surface appearance can be obtained in good percentage yield.

DESCRIPTION OF EMBODIMENTS

Modified PVA Powder

Importantly, a modified PVA powder of the present invention contains a structural unit derived from a derivative (A) of an ethylenically unsaturated dicarboxylic acid in a content (X) of from 0.05 mol % to 10 mol %, preferably 0.2 mol % to 10 mol %, more preferably 1.0 mol % to 8.0 mol %, further preferably 1.5 mol % to 6.0 mol %, particularly preferably 2.5 mol % to 6.0 mol %. When the content (X) of the structural unit derived from a derivative (A) of an ethylenically unsaturated dicarboxylic acid is less than 0.05 mol %, it may not be possible to introduce carboxylic acid in amounts large enough to develop the desired performance, including improvement of paper surface strength. A content (X) of more than 10 mol % may cause problems in handling as a result of, for example, formation of blocks due to excessively high water solubility and the resulting adhesion of modified PVA powder particles in the presence of moisture in air. The modified PVA powder also may fail to provide sufficient practical properties such as film strength. Further, a difficulty may arise in confining the insoluble component within a controlled amount of less than 2,000 ppm because, with a content (X) of more than 10 mol %, the water-insoluble component occurs in increased amounts by crosslinkage during production. The content (X) of the structural unit derived from a derivative (A) of an ethylenically unsaturated dicarboxylic acid can be calculated by $^1$H-NMR analysis of a vinyl ester copolymer (C) before saponification.

In this specification, the upper and lower limits of numerical ranges (e.g., contents of components, and calculated values and various properties of components) may be combined as appropriate.

Importantly, the modified PVA of the present invention has a degree of saponification of from 80.0 mol % to 99.9 mol %, preferably 82.0 mol % to 99.9 mol %, more preferably 85.0 mol % to 99.9 mol %. With a degree of saponification of less than 80.0 mol %, the modified PVA may fails to provide sufficient practical properties such as strength, or a difficulty may arise in achieving a content of less than 2,000 ppm for components that are insoluble in a 90° C., 5 weight % aqueous solution. A degree of saponification of 99.9 mol % or more is practically not achievable. The degree of saponification of the modified PVA can be measured following the method described in JIS K 6726 (1994).

The viscosity-average degree of polymerization (hereinafter, also referred to as simply as "degree of polymerization") of the modified PVA of the present invention is not particularly limited, and is preferably 100 to 5,000, more preferably 150 to 4,500, further preferably 200 to 4,000. The degree of polymerization of the modified PVA can be measured following the method described in JIS K 6726 (1994).

Importantly, the methanol content in the modified PVA powder of the present invention is 0.01 weight % or more and less than 3.0 weight %, preferably 0.01 weight % or more and less than 2.5 weight %, further preferably 0.01 weight % or more and less than 2.0 weight % as measured under the predetermined conditions described below. A methanol content of less than 0.01 weight % is practically not achievable.

The methanol content in the modified PVA powder of the present invention is determined in the manner described below, using headspace gas chromatography.

Creation of Standard Curve

Three aqueous solutions of known methanol concentrations are prepared, using isopropyl alcohol as an internal standard. A standard curve is created by measuring these aqueous solutions with a gas chromatography device (GC-2010, Shimadzu Corporation) installed with a headspace sampler (Turbo Matrix HS40, Parkin Elmer).

Measurement of Methanol Content in Modified PVA Powder

Distilled water is taken into a 1,000 mL-graduated flask by filling it to a marked line, and 0.1 mL of isopropyl alcohol as an internal standard solution is added with a graduated pipette. The mixture is then thoroughly stirred. This solution will be called "solvent". Thereafter, 500 mg of the modified PVA powder is weighed into a vial container for headspace gas chromatography measurement, and, after putting a stir bar, the solvent is charged into the vial container in a measured amount of 10 mL using a volumetric pipette. After placing and securely locking a cap on the vial container, the vial container is placed on a hot stirrer, and the modified PVA powder is dissolved under heat. The modified PVA powder is subjected to headspace gas chromatography measurement after visually confirming that the powder has completely dissolved. The methanol content of the modified PVA powder is then determined from the standard curve previously created.

The modified PVA powder of the present invention contains 0.1 ppm or more and less than 2,000 ppm, preferably 0.1 ppm or more and less than 1,000 ppm, further preferably 0.1 ppm or more and less than 500 ppm of a component insoluble in a 90° C., 5 weight % aqueous solution. A content of less than 0.1 ppm is practically not achievable. When the content of components insoluble in the specific aqueous solution is 2,000 ppm or more, the product film tends to break, or a pinhole tends to occur in a pouch (packaging material) obtained from the modified PVA powder, reducing the percentage yield of the pouch. As used herein, "ppm" means "ppm by weight."

The content of components insoluble in the specific aqueous solution is determined as follows. A 500-mL flask fitted with an agitator and a reflux condenser is placed in a 20° C. water bath, and 285 g of distilled water is charged into the flask, and stirred at 300 rpm. Thereafter, a weighed amount (15 g) of the modified PVA powder is gradually charged into the flask. After all the modified PVA powder (15 g) is charged into the flask, the water bath temperature is increased to 90° C. over a time period of about 30 minutes to dissolve the modified PVA powder, and obtain a modified PVA solution. After the water bath temperature reaches 90° C., the modified PVA powder is further dissolved while stirring the mixture for 60 minutes at 300 rpm. The modified PVA solution is then filtered through a metal filter with 63-μm openings to trap undissolved remaining particles of modified PVA (hereinafter, also referred to as "undissolved particles"). After filtration, the filter is thoroughly washed with 90° C. hot water to remove the modified PVA solution adhering to the filter. The filter with the remaining undissolved particles is then dried for 1 hour with a heating drier at 120° C. The weight of the undissolved particles is calculated by comparing the filter weight after drying with the weight of the filter before filtration. The calculated weight of the undissolved particles is the amount of components insoluble in the specific aqueous solution.

The derivative (A) of an ethylenically unsaturated dicarboxylic acid used in the present invention is not particularly limited, as long as it is not detrimental to the effects of the present invention. Preferred as the derivative (A) of an ethylenically unsaturated dicarboxylic acid are monomeric monoesters, diesters, or anhydrides of ethylenically unsaturated dicarboxylic acids. Specific examples of the derivative (A) of an ethylenically unsaturated dicarboxylic acid include: monoalkyl unsaturated dicarboxylic acid esters such as monomethyl maleate, monoethyl maleate, monomethyl fumarate, monoethyl fumarate, monomethyl citraconate, monoethyl citraconate, monomethyl mesaconate, monoethyl mesaconate, monomethyl itaconate, and monoethyl itaconate; dialkyl unsaturated dicarboxylic acid esters such as dimethyl maleate, diethyl maleate, dimethyl fumarate, diethyl fumarate, dimethyl citraconate, diethyl citraconate, dimethyl mesaconate, diethyl mesaconate, dimethyl itaconate, and diethyl itaconate; and anhydrides of unsaturated dicarboxylic acids, such as maleic anhydride, and citraconic anhydride. From the viewpoints of industrial availability and reactivity with vinyl ester monomers, the monomers are preferably maleic acid monoalkyl esters, maleic acid dialkyl esters, maleic anhydride, fumaric acid monoalkyl esters, and fumaric acid dialkyl esters, particularly preferably monomethyl maleate, and maleic anhydride. The modified PVA powder of the present invention may have a structural unit derived from at least one of the derivatives (A) of ethylenically unsaturated dicarboxylic acids above, or a structural unit derived from two or more of the derivatives (A) of ethylenically unsaturated dicarboxylic acids above.

From the viewpoint of reducing the amount of components insoluble in the specific aqueous solution, it is preferable that at least a part of the structural unit derived from a derivative (A) of an ethylenically unsaturated dicarboxylic acid be a structural unit represented by the following formula (I),

[Chem. 2]

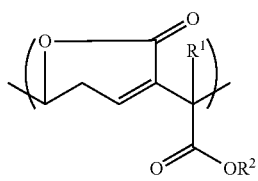

(I)

wherein $R^1$ is a hydrogen atom, or a linear or branched alkyl group of 1 to 8 carbon atoms, and $R^2$ is a metal atom, a hydrogen atom, or a linear or branched alkyl group of 1 to 8 carbon atoms, and that the modified vinyl alcohol polymer powder satisfy the following formula (Q), $$0.05 \leq Y/X < 0.98 \quad (Q),$$

wherein X is the content of the structural unit derived from a derivative (A) of an ethylenically unsaturated dicarboxylic acid (hereinafter, also referred to as "modifying content (X)"), and Y is the content of the structural unit represented by formula (I) (hereinafter, also referred to as "modifying content (Y)").

With Y/X satisfying the range represented by formula (Q), the modified PVA powder having a reduced content of insoluble components in the specific aqueous solution can easily be made in industrial production. The lower limit of Y/X is preferably 0.06 or more. The upper limit of Y/X is preferably 0.80 or less, further preferably 0.60 or less, particularly preferably 0.40 or less. The content (Y) of the structural unit represented by formula (I) is the ratio of the number of moles of the structural unit of formula (I) to the total number of moles of the monomer unit constituting the main chain of the modified PVA.

Examples of the linear or branched alkyl group of 1 to 8 carbon atoms represented by $R^1$ and $R^2$ include methyl, ethyl, n-propyl, isopropyl, n-butyl, isobutyl, sec-butyl, 2-methylpropyl, tert-butyl, n-pentyl, isopentyl, sec-pentyl, neopentyl, tert-pentyl, 1-ethylpropyl, 1,1-dimethylpropyl, 1,2-dimethylpropyl, n-hexyl, 1-methylpentyl, 2-methylpentyl, 3-methylpentyl, 4-methylpentyl (isohexyl), 1-ethylbutyl, 2-ethylbutyl, 1,1-dimethylbutyl, 1,2-dimethylbutyl, 1,3-dimethylbutyl, 1,4-dimethylbutyl, 2,2-dimethylbutyl, 2,3-dimethylbutyl, 3,3-dimethylbutyl, 1-ethyl-2-methylpropyl, 1,1,2-trimethylpropyl, n-heptyl, 2-methylhexyl, n-octyl, isooctyl, tert-octyl, 2-ethylhexyl, and 3-methylheptyl. The alkyl group has preferably 1 to 6 carbon atoms, more preferably 1 to 4 carbon atoms, further preferably 1 to 3 carbon atoms.

Examples of the metal atom represented by $R^2$ include alkali metals such as sodium, potassium, rubidium, and cesium; and alkali earth metals such as calcium, barium, strontium, and radium. Preferred are alkali metals, and sodium is more preferred.

In the modified PVA powder produced by using a derivative (A) of an ethylenically unsaturated dicarboxylic acid, the structural unit derived from the derivative (A) of an ethylenically unsaturated dicarboxylic acid introduced in the modified PVA powder has been found to partly form the six-membered lactone ring structure of the formula (I) after saponification. The six-membered lactone ring structure represented by the formula (I) opens its ring under heat, and forms a crosslinked unit by subsequently undergoing an intermolecular esterification reaction, as described in Non Patent Literature 1. This may result in the modified PVA powder containing an increased amount of components that are insoluble in the aqueous solution. That is, the crosslinking reaction can be said as being inhibited when the content (Y) of the structural unit represented by formula (I) is higher than the content (X) of the introduced structural unit derived from a derivative (A) of an ethylenically unsaturated dicarboxylic acid. A $^1$H-NMR measurement using deuterated dimethyl sulfoxide solvent should detect the six-membered lactone ring structure of the formula (I) at 6.8 to 7.2 ppm in its spectrum. In order for the modified PVA powder of the present invention to contain less than 2,000 ppm of components that are insoluble in the specific aqueous solution, the content (Y) of the structural unit represented by formula (I) should preferably satisfy the formula (Q) with respect to the content (X) of the structural unit derived from a derivative (A) of an ethylenically unsaturated dicarboxylic acid determined from the vinyl ester copolymer (C) before saponification. When Y/X is 0.50 in formula (Q), it means that a half of all the introduced structural units derived from a derivative (A) of an ethylenically unsaturated dicarboxylic acid is forming the structural unit represented by formula (I).

The particle diameter of the particles constituting the modified PVA powder of the present invention is not particularly limited. It is, however, preferable that at least 95 weight % of all particles of the modified PVA powder pass through a sieve with 1.00-mm openings, more preferably a sieve with 710-μm openings, particularly preferably a sieve with 500-μm openings. Here, "at least 95 weight % of all particles of the modified PVA powder" means that, for example, at least 95 weight % of particles pass through a sieve with 1.00-mm openings in terms of a cumulative particle size distribution. When particles that pass through a sieve with 1.00-mm openings are less than 95 weight %, the methanol incorporated in the modified PVA powder does not vaporize as easily, and the methanol content may exceed 3.0 weight %. Another possibility is that, because of the large particle size, the amount of insoluble components in the aqueous solution may increase as a result of defects such as uneven drying. The particle diameter of the particles constituting the modified PVA powder of the present invention is preferably such that particles that pass through a sieve with 500-μm openings is at least 30 weight %, more preferably 35 weight %, further preferably at least 45 weight %, particularly preferably at least 56 weight % of all particles of the modified PVA powder. The particle diameter of the particles constituting the modified PVA powder of the present invention is preferably such that at least 99 weight % of the modified PVA powder pass through a sieve with 1.00-mm openings, and that, particularly preferably, at least 99 weight % of the modified PVA powder pass through a sieve with 1.00-mm openings, and at least 56 weight % pass through a sieve with 500-μm openings. The sieve opening complies with the nominal opening W of JIS Z 8801-1-2006.

Method of Production of Modified PVA Powder

A method for producing a modified PVA powder of the present invention is described below in detail. It is to be noted that the present invention is not limited to the embodiments described below.

A modified PVA powder of the present invention is produced by, for example, a method that includes the steps of:

copolymerizing a derivative (A) of an ethylenically unsaturated dicarboxylic acid with a vinyl ester monomer (B) to obtain a vinyl ester copolymer (C);

saponifying the vinyl ester copolymer (C) in an alcohol solution with an alkali catalyst or an acid catalyst; and washing and drying the vinyl ester copolymer (C).

Examples of the vinyl ester monomer (B) include vinyl formate, vinyl acetate, vinyl propionate, vinyl valarate, vinyl caprate, vinyl laurate, vinyl stearate, vinyl benzoate, vinyl pivalate, and vinyl versatate. Particularly preferred is vinyl acetate.

Copolymerization of the derivative (A) of an ethylenically unsaturated with the vinyl ester monomer (B) is achieved by using known methods, including, for example, bulk polymerization, solution polymerization, suspension polymerization, and emulsion polymerization. Typically, copolymerization is achieved by bulk polymerization, which does not use solvent, or by solution polymerization, which uses a solvent such as an alcohol. From the standpoint of making the present invention more effective, it is preferable to use solution polymerization that uses a lower alcohol, such as methanol, for polymerization. When using bulk polymerization or solution polymerization, the polymerization reaction may be batch or continuous.

The initiator used for polymerization reaction is not particularly limited, as long as it is not detrimental to the effects of the present invention. For example, various known initiators may be used, including azo initiators such as 2,2'-azobis(isobutyronitrile), 2,2'-azobis(2,4-dimethylvaleronitrile), and 2,2'-azobis(4-methoxy-2,4-dimethylvaleronitrile); and organic peroxide initiators such as benzoyl peroxide, and n-propyl peroxycarbonate. The polymerization temperature in polymerization reaction is not particularly limited, and may be 5 to 200° C., or 30 to 150° C.

For copolymerization of the derivative (A) of an ethylenically unsaturated dicarboxylic acid with the vinyl ester monomer (B), a copolymerizable monomer (D) may optionally be used for copolymerization, in addition to the derivative (A) of an ethylenically unsaturated dicarboxylic acid, and the vinyl ester monomer (B), provided that use of such an additional monomer is not detrimental to the effects of the present invention. Examples of the monomer (D) include:

α-olefins such as ethylene, propylene, 1-butene, isobutene, and 1-hexene;

acrylamide monomers such as acrylamide, N-methyl acrylamide, and N-ethyl acrylamide;

methacrylamide monomers such as methacrylamide, N-methyl methacrylamide, and N-ethyl meth acrylamide;

vinyl ether monomers such as methyl vinyl ether, ethyl vinyl ether, n-propyl vinyl ether, isopropyl vinyl ether, and n-butyl vinyl ether;

hydroxyl-containing vinyl ether monomers such as ethylene glycol vinyl ether, 1,3-propanediol vinyl ether, and 1,4-butanediol vinyl ether;

allyl ether monomers such as propyl allyl ether, butyl allyl ether, and hexyl allyl ether;

monomers having an oxyalkylene group;

hydroxyl-containing α-olefins such as isopropenyl acetate, 3-buten-1-ol, 4-penten-1-ol, 5-hexen-1-ol, 7-octen-1-ol, 9-decen-1-ol, and 3-methyl-3-buten-1-ol;

monomers having a silyl group, such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamidepropyltrimethoxysilane, and 3-(meth)acrylamidepropyltriethoxysilane; and N-vinylamide monomers such as N-vinylformamide, N-vinylacetamide, N-vinyl-2-pyrrolidone, and N-vinyl-2-caprolactam.

The monomer (D) is used typically in a proportion of 10 mol % or less, preferably 5.0 mol % or less, more preferably 3.0 mol % or less, further preferably 2.0 mol % or less of all monomers used for copolymerization, though the amount varies with conditions such as the intended use and applications.

The modified PVA powder is obtained after the vinyl ester copolymer (C) obtained in the copolymerization step is subjected to saponification in an alcohol solvent, followed by washing and drying. The saponification and drying conditions under which the modified PVA powder of the present invention is obtained are not particularly limited. It is, however, preferable that the water content of the raw saponification solution, and the drying temperature and time of the PVA resin be confined in specific ranges so that the methanol content in the modified PVA powder, and the content of components insoluble in the specific aqueous solution can be reduced.

The raw saponification solution may be prepared by adding a small amount of water to the solution containing the vinyl ester copolymer (C) and solvent from the copolymerization step. Preferably, the amount of water is adjusted so that the water content of the raw saponification solution (or "water content of the system") is more than 1.0 weight % and less than 5.0 weight %. The water content is more preferably 1.5 to 4.0 weight %. When the water content is 1.0 weight % or less, the alkali catalyst does not easily deactivate itself, and may act to catalyze the crosslinking reaction, and increase the content of the water-insoluble component in the drying process. When the water content is 5.0 weight % or more, the rate of saponification reaction may decrease, or the modified PVA powder, because it is easily dissolvable in water, may dissolve into the saponification reaction solution. This may cause problems in the manufacturing process.

The solvent used for the saponification reaction may be, for example, methanol, ethanol, or isopropyl alcohol. These may be used alone or in a combination of two or more. The solvent may be a mixed solvent containing an ester, such as methyl acetate, provided that it does not interfere with the saponification reaction. Preferred as the solvent is methanol, or a mixed solvent of methanol and methyl acetate.

Typically, an alkali catalyst is used as the catalyst of the saponification reaction of the vinyl ester copolymer (C). Examples of the alkali catalyst include hydroxides of alkali metals, such as potassium hydroxide, and sodium hydroxide; and alkoxides of alkali metals, such as sodium methoxide. Preferred is sodium hydroxide. The catalyst is used in an amount of preferably 0.005 to 0.50, more preferably 0.008 to 0.40, particularly preferably 0.01 to 0.30 in terms of a molar ratio with respect to the vinyl ester monomer unit of the vinyl ester copolymer (C). The catalyst may be added at once in an initial stage of the saponification reaction, or may be added during the saponification reaction after adding a part of the catalyst in an initial stage of the saponification reaction.

The saponification reaction temperature is preferably 5 to 80° C., more preferably 20 to 70° C. The saponification reaction time is preferably 5 minutes to 10 hours, more preferably 10 minutes to 5 hours. The saponification reaction may be batch or continuous. In a saponification reaction using an alkali catalyst, the saponification reaction may be stopped by neutralizing any remaining catalyst by addition of an acid such as acetic acid and lactic acid, as required. However, such neutralization by addition of an acid is not desirable from the viewpoint of reducing the water-insoluble component below 2,000 ppm, because any remaining acid after neutralization tends to facilitate intermolecular crosslinking reaction in the modified PVA in the drying process.

The saponification reaction is not particularly limited, and may be carried out by any known method. Examples of such methods include:

(1) a method that mixes a catalyst with a prepared solution containing 20 weight % or higher concentrations of vinyl ester copolymer (C), and that pulverizes the resulting semi-solid (gelatinous material) or solid with a pulverizer to obtain a modified PVA powder;

(2) a method in which the vinyl ester copolymer (C) is dissolved in a controlled concentration of less than 10 weight % in a solvent containing an alcohol (preferably, methanol) to prevent the whole reaction solution from turning into a non-fluidic gelatinous solution, and to precipitate the modified PVA in the solvent in the form fine particles dispersed in methanol; and (3) a method that emulsifies the vinyl ester copolymer (C) by adding a saturated hydrocarbon solvent, or saponifies the vinyl ester copolymer (C) in suspended phase to obtain a modified PVA powder.

In method (1), the pulverizer is not particularly limited, and known pulverizers or comminutors may be used. From a production standpoint, method (1) or (2) is preferred that does not require a saturated hydrocarbon solvent. Method (2) is more preferred from the standpoint of reducing the methanol content. Method (2) is also industrially more advantageous because it enables reduction of methanol content even when the subsequent washing and drying are carried out under milder conditions than conventionally performed, in addition to producing trace amounts of components that are insoluble in the aqueous solution. In method (2), the vinyl ester copolymer (C) dissolved in a solvent containing methanol, or a partially saponified product of vinyl ester copolymer (C) has a concentration of preferably less than 8.0 weight %, more preferably less than 5.0 weight %, further preferably less than 4.0 weight %.

Preferably, the saponification step is followed by an additional step of washing the modified PVA, as required, in order to make the methanol content of the modified PVA powder less than 3.0 weight %. The washing solution may be a solution containing water and/or an ester (such as methyl acetate) with a lower alcohol (such as methanol) contained as a primary component. The washing solution is preferably a solution containing methyl acetate with methanol contained as a primary component. For economy and ease of procedures, it is preferable that methanol, which is preferably used in the copolymerization of vinyl ester copolymer (C), and the methyl acetate that generates in the saponification step be used as a washing solution because, in this case, the washing solution can be recycled in these steps, and no other solvent needs to be prepared as a washing solution. Apart of the washing solvent may impregnate the PVA powder in the process of washing, and replace the methanol contained in the PVA powder. It is accordingly preferable that the content of methyl acetate in the washing solution be 45 volume % or more, in order to achieve a methanol content of less than 3.0 weight % in the modified PVA powder after drying. More preferably, the content of methyl acetate in the washing solution is 60 volume % or more. In order to produce a modified PVA powder containing an even smaller amount of components that are insoluble in the specific aqueous solution, the methyl acetate content is particularly preferably 70 volume % or more.

The modified PVA powder of the present invention can be obtained upon drying the polymer after the saponification step or washing step. Specifically, the polymer is dried preferably by hot-air drying using a cylindrical drier, and the modified PVA being dried has a temperature of preferably more than 80° C. and less than 120° C., more preferably 90° C. or more and less than 110° C. The drying time is preferably 2 to 10 hours, more preferably 3 to 8 hours. Under these drying conditions, it becomes easier to achieve a methanol content of less than 3.0 weight % in the modified PVA powder, and to reduce the insoluble component in the specific aqueous solution below 2,000 ppm.

Another embodiment of the present invention is a resin composition that contains the modified PVA powder and an unmodified PVA, and in which the content of the unmodified PVA is less than 50 weight %. The content of the unmodified PVA in the resin composition is not particularly limited, as long as it is 0 weight % or more and less than 50 weight %. For example, the content of the unmodified PVA may be 0 weight % or more and less than 40 weight %, 0 weight % or more and less than 20 weight %, 0 weight % or more and less than 10 weight %, or 0 weight %. The degree of polymerization of the unmodified PVA is not particularly limited, and may be, for example, 100 to 5,000. The degree of polymerization of the unmodified PVA can be measured according to the method described in JIS K 6726 (1994). The degree of saponification of the unmodified PVA may be 80.0 mol % or more and 99.9 mol % or less. The degree of saponification of the unmodified PVA may be measured according to the method described in JIS K 6726 (1994).
Water-Soluble Film A water-soluble film containing the modified PVA powder represents another embodiment of the present invention. In the modified PVA powder of the present invention, the component that is insoluble in the specific aqueous solution is contained in a smaller amount than previously achieved, specifically, less than 2,000 ppm, as mentioned above. Accordingly, film breakage due to the component insoluble in the aqueous solution is further reduced. This allows a water-soluble film of the present invention to be used for efficient production of packaging materials, such as a pouch, having a desirable surface appearance with no pinholes. The modified PVA powder content in a water-soluble film containing the modified PVA powder is not particularly limited, and may be more than 50 weight %, 60 weight % or more, or 70 weight % or more.

Another embodiment of the present invention is, for example, a water-soluble film containing a resin composition that contains the modified PVA powder and an unmodified PVA, and in which the content of the unmodified PVA is less than 50 weight %. In the resin composition forming the water-soluble film, the unmodified PVA content is not particularly limited, as long as it is 0 weight % or more and less than 50 weight %. For example, the unmodified PVA content may be 0 weight % or more and less than 40 weight %, 0 weight % or more and less than 20 weight %, 0 weight % or more and less than 10 weight %, or 0 weight %.

A water-soluble film typically requires strength or toughness that can withstand use in high-temperature and high-humidity regions or in cold environments, and, particularly, needs to have impact resistance under low temperature. For improved low-temperature impact resistance, the water-soluble film of the present invention may contain various plasticizers to lower its glass transition point. Additionally, the water-soluble film of the present invention may contain a plasticizer to improve its solubility in water.

The plasticizer contained in the water-soluble film of the present invention is not particularly limited, as long as it is a plasticizer commonly used for PVA. Examples include polyalcohols such as glycerin, diglycerin, diethylene glycol, triethylene glycol, propylene glycol, dipropylene glycol, trimethylolpropane, pentaerythritol, 1,3-butanediol, and 2-methyl-1,3-propanediol; polyethers such as polyethylene glycol, and polypropylene glycol; polyvinylamide such as polyvinylpyrrolidone; amide compounds such as N-methylpyrrolidone, and dimethylacetoamide; and compounds containing ethylene oxide added to polyalcohols such as glycerin, pentaerythritol, and sorbitol. These may be contained either alone or in a combination of two or more. The preferred plasticizers for improved water solubility are glycerin, diglycerin, diethylene glycol, triethylene glycol, propylene glycol, dipropylene glycol, trimethylolpropane, 2-methyl-1,3-propanediol, polyethylene glycol, and polyvinylpyrrolidone. Glycerin, diglycerin, trimethylolpropane, 2-methyl-1,3-propanediol, polyethylene glycol, and polyvinylpyrrolidone are particularly preferred for their effect to reduce decrease of the water solubility of the film due to a bleed-out of the plasticizer.

When polyethylene glycol is used as the plasticizer, the molecular weight of the polyethylene glycol is not particularly limited. However, from the viewpoints of compatibility with PVA and reducing decrease of water solubility due to a bleed-out, the molecular weight is preferably 100 to 1,000 in terms of a number average molecular weight (Mn). The molecular weight of polyvinylpyrrolidone is not particularly limited either. However, for compatibility with PVA, the molecular weight of polyvinylpyrrolidone is preferably 1,000 to 20,000 in terms of a weight-average molecular weight (Mw).

Preferably, the plasticizer is contained in 1 to 50 parts by weight with respect to 100 parts by weight of the modified PVA powder. When the plasticizer content is less than 1 part by weight, the plasticizer tends not to develop its effect. When the plasticizer content is more than 50 parts by weight, the plasticizer tends to bleed out more, with the result that the anti-blocking property of the product film is impaired. From the viewpoint of the rate of dissolution of the film against water, the plasticizer is contained in a proportion of preferably 20 parts by weight or more with respect to 100 parts by weight of the modified PVA powder. From the viewpoint of the elasticity of the product film (processibility through, for example, a bag-making machine), the plasticizer is contained in a proportion of preferably 40 parts by weight or less with respect to 100 parts by weight of the modified PVA powder.

The water-soluble film of the present invention may contain a surfactant, as required. The surfactant is preferably an anionic or a nonionic surfactant, though the type of surfactant is not particularly limited. Preferred examples of the anionic surfactant include carboxylic acid surfactants such as sodium myristate, sodium palmitate, sodium stearate, sodium laurate, and potassium laurate; sulfuric acid ester surfactants such as sodium octyl sulfonate; phosphoric acid ester surfactants such as lauryl phosphate, and sodium lauryl phosphate; and sulfonic acid surfactants such as sodium dioctyl sulfosuccinate, and sodium dodecylbenzene sulfonate. Preferred examples of the nonionic surfactant include alkyl ether surfactants such as polyoxyethylene lauryl ether, and polyoxyethylene oleyl ether; alkyl phenyl ether surfactants such as polyoxyethylene octyl phenyl ether; alkyl ester surfactants such as polyoxyethylene laurate; alkylamine surfactants such as polyoxyethylene lauryl amino ether; alkylamide surfactants such as polyoxyethylene laurylamide; polypropylene glycol ether surfactants such as polyoxyethylene polyoxypropylene ether; alkanolamide surfactants such as oleic acid diethanolamide; and allyl phenyl ether surfactants such as polyoxyalkylene allyl phenyl ether. These surfactants may be used either alone or in a combination of two or more.

The surfactant content is preferably 0.01 to 5 parts by weight, more preferably 0.1 to 2 parts by weight, further preferably 0.2 to 0.5 parts by weight with respect to 100 parts by weight of the modified PVA powder. When the surfactant content is less than 0.01 parts by weight, a difficulty tends to arise in producing the film because such a small content makes it difficult to release the film from the metal surface of a film forming machine such as a drum surface. A surfactant content of more than 5 parts by weight tends to cause blocking as a result of the surfactant dissolving in the film surface, with the result that the handling properties are impaired.

The water-soluble film of the present invention may contain a sugar, as required. Examples of the sugar include monosaccharides, oligosaccharides, polysaccharides, chained sugar alcohols, and starch. Examples of the monosaccharides include glucose. Examples of the oligosaccharides include galacto-oligosaccharides, isomalto-oligosaccharides, xylo-oligosaccharides, soy oligosaccharides, nigero oligosaccharides, lactosucrose, and fructo oligosaccharides. Examples of the polysaccharides include starch, cellulose, chitin, chitosan, hemicellulose, pectin, pullulan, agar, alginic acid, carrageenan, dextrin, and trehalose.

Examples of the chained sugar alcohols include tetritols (alditols having 4 carbon atoms) such as threitol, and erythritol; pentitols (alditols having 5 carbon atoms) such as arabinitol, and xylitol; and hexitols (alditols having 6 carbon atoms) such as iditol, galactitol, mannitol, and sorbitol. Examples of the starch include raw starches such as corn and potatoes, and chemically or physically processed products of such starches (e.g., dextrin, oxidized starch, etherified starch, and cationized starch). These sugars may be used either alone or in a combination of two or more. Containing sugar is advantageous in further improving water solubility and biodegradability of the film. Other advantages include improved resistance against borate ions, and sustained solubility in cold water after packaging of chemicals, particularly chemicals (e.g., chlorine-based materials) that degrade PVA. Particularly preferred among these sugars is starch because starch provides desirable cold-water solubility for the sugar-added film.

The sugar content is preferably 1 to 100 parts by weight, further preferably 2 to 90 parts by weight, particularly preferably 3 to 80 parts by weight with respect to 100 parts by weight of the modified PVA powder. Typically, PVA has poor compatibility with sugars, and, when the sugar is contained in large amounts, the product film tends to greatly suffer from poor mechanical properties, such as poor film strength. However, the modified PVA powder used in the water-soluble film of the present invention has excellent compatibility with sugars, starch in particular, allowing and the water-soluble film of the present invention to contain a large amount of sugar. When the sugar content is less than 1 part by weight, the film tends to have insufficient water solubility and biodegradability. When the sugar content is more than 100 parts by weight, the film tends to easily break because of reduced low-temperature impact resistance.

The water-soluble film of the present invention may contain an inorganic filler, as required. Examples of the inorganic filler include silica, calcium carbonate (heavy or light calcium carbonate, or surface-treated calcium carbonate), aluminum hydroxide, aluminum oxide, titanium oxide, diatomaceous earth, barium sulfate, calcium sulfate, zeolite, zinc oxide, silicic acid, silicate, mica, magnesium carbonate, kaolin, halloysite, pyrophyllite, clay (such as sericite), and talc. These inorganic fillers may be used alone or in a combination of two or more. Preferred for dispersibility in PVA is talc. From the standpoint of preventing blocking in the film, the average particle diameter of the inorganic filler is preferably 1 μm or more. From the standpoint of dispersibility in the modified PVA powder, the average particle diameter of the inorganic filler is preferably 10 μm or less. In order to prevent blocking in the film while satisfying the desired dispersibility in PVA by addition of an inorganic filler, the inorganic filler used should preferably have an average particle diameter of about 1 to 7 μm. The average particle diameter can be measured with a laser diffraction particle size analyzer (SALD-2100; Shimadzu Corporation), using a 0.2% sodium hexametaphosphate aqueous solution as a dispersion medium.

From the viewpoints of preventing blocking in the film and desirably dispersing the inorganic filler in the modified PVA powder, the inorganic filler content is preferably 0.5 to 20 parts by weight, more preferably 0.7 to 15 parts by weight, particularly preferably 1 to 10 parts by weight with respect to 100 parts by weight of the modified PVA powder. When contained in an amount of more than 20 parts by weight with respect to 100 parts by weight of the modified PVA powder, the inorganic filler suffers from poor dispersibility in the modified PVA powder, and tends to aggregate, with the result that the water solubility of the product film is impaired.

The water-soluble film of the present invention may contain an antioxidant, as required. Examples of the antioxidant include ascorbic acid, tocopherol, dibutyl hydroxy toluene, butyl hydroxy anisole, sorbic acid, sodium sorbate, sodium erythorbate, propyl gallate, sodium sulfite, sodium metabisulfite, 2,5-di-t-butylhydroquinone, 2,6-di-t-butyl-p-cresol, 4,4'-thio-bis-(6-t-butylphenol), 2,2'-methylene-bis-(4-methyl-6-t-butylphenol), octadecyl-3-(3,5-di-t-butyl-4-hydroxyphenyl)propionate (Irganox 1076), and 4,4'-thio-bis (3-methyl-6-t-butylphenol).

From the viewpoint of improving the anti-oxidation performance of the film, the antioxidant content is preferably 0.01 to 10 parts by weight, more preferably 0.1 to 5 parts by weight, particularly preferably 0.5 to 3 parts by weight with respect to 100 parts by weight of the modified PVA powder.

The water-soluble film of the present invention may further contain optional additives, as required, such as a colorant, a fragrance, a bulking agent, a defoaming agent, a release agent, and a ultraviolet absorber, as appropriate. When it is of importance to improve the releasability of the product film from a metal surface of a film forming machine such as a dice or drum surface, it is preferable to contain the additives in a proportion of 0.01 to 5 parts by weight with respect to 100 parts by weight of the modified PVA powder. The water-soluble film of the present invention may also contain a water-soluble polymer, as required, provided that it is not detrimental to the effects of the present invention. Examples of such water-soluble polymers include PVAs (modified PVA or unmodified PVA) different from the modified PVA powder of the present invention, carboxymethyl cellulose, polyacrylamide, polyacrylic acid or a salt thereof, methyl cellulose, and hydroxymethyl cellulose. From the viewpoint of improving the water solubility of the film, it is preferable to add a low-viscosity carboxymethyl cellulose.

A raw material to be used for the production of the water-soluble film of the present invention can be prepared by dissolving or dispersing the modified PVA powder in a solvent in a stirring vessel, or by melting and kneading the modified PVA powder with an extruder using known methods, after adding optional components such as plasticizers, sugars, and inorganic fillers, as required.

The water-soluble film of the present invention may be produced by using known methods, including, for example, casting, and melt extrusion, and the method of production is not particularly limited. For example, the modified PVA powder, a plasticizer, and optional additives (for example, a surfactant, and a sugar) are dissolved in an aqueous solvent (for example, water), and the resulting solution is held still on a smooth cast surface. After the aqueous solvent has evaporated, the remaining film is released from the cast surface to obtain a transparent and uniform water-soluble film of the present invention. The aqueous solvent is preferably water. The cast surface may be any material, provided that it is smooth and hard. Examples include steel, aluminum, glass, and polymers (for example, polyolefin, polyethylene, polyamide, polyvinyl chloride, polycarbonate, and polyhalo-carbon). The evaporation rate of the aqueous solvent can be increased by heating the cast surface, or by exposing the deposited solution to, for example, heated air or infrared rays.

The water-soluble film of the present invention has a thickness of preferably 10 to 200 µm. From the standpoint of a balance between film strength and water solubility, the film thickness is more preferably 20 to 150 µm, particularly preferably 30 to 120 µm.

In order to improve the blocking preventing property of the water-soluble film of the present invention, the water-soluble film may be subjected to additional treatments, as required, whereby a matte surface is imparted to the water-soluble film using rolls, or a powder for preventing blocking, for example, silica or starch, is applied to the water-soluble film, or the water-soluble film is embossed. A matte surface may be imparted by forming the film with rolls having fine irregularities on their surfaces brought into contact with the film before drying. For embossing, typically, the film is nipped with an embossing roll and a rubber roll under applied heat or pressure after being formed. The matte surface treatment with rolls, and embossing are more preferred over powder application because powder application is not applicable to films intended for certain uses, though powder application can more effectively prevent blocking. The matte surface treatment is particularly preferred from the standpoint of the effectiveness of blocking prevention.

The water-soluble film of the present invention has desirable solubility in cold water, and can produce a packaging material with a desirable surface appearance in good percentage yield. This makes the water-soluble film useful for a wide range of materials, including chemical packaging materials, and sanitary materials. The chemicals are not particularly limited, and may be, for example, laundry detergents, bleaching agents, or agrichemicals (for example, Bordeaux mixture, which contains basic copper sulphate as an active ingredient). The form of chemical is not particularly limited, and may be liquid or solid (for example, a powder, a granule, or a clump).

The present invention encompasses embodiments obtainable by combining the above configurations in various manners within the technical scope of the present invention, as long as the effect of the present invention can be obtained.

EXAMPLES

The present invention will be described in more detail by way of Examples. It should be noted that the present invention is in no way limited to the Examples given below, and the present invention can be implemented in various modifications within the technical idea of the present invention by a person with common knowledge in the art. In the following Examples and Comparative Examples, "part" means "part by weight", and "%" means "weight %", unless otherwise specifically stated.

Viscosity-Average Degree of Polymerization of Modified PVA

The viscosity-average degree of polymerization of the modified PVA was measured following JIS K 6726 (1994). Specifically, when the degree of saponification was less than 99.5 mol % in the modified PVA, the modified PVA was saponified until the degree of saponification became 99.5 mol % or more, and was measured for viscosity-average degree of polymerization (P), using the intrinsic viscosity [η] (liter/0 measured in water at 30° C., as follows.

$$P=([\eta]\times10^4/8.29)^{(1/0.62)}$$

Degree of Saponification of Modified PVA

The degree of saponification of the modified PVA was determined following the method described in JIS K 6726 (1994).

Content (X) of Structural Unit Derived from Derivative (A) of Ethylenically Unsaturated Dicarboxylic Acid Content (X) was calculated from a spectrum of the modifying species by $^1$H-NMR spectral analysis.

Content (Y) of Structural Unit Represented by Formula (I)

Content (Y) was calculated from a signal detected at 6.8 to 7.2 ppm in a $^1$H-NMR spectral analysis using dimethyl sulfoxide solvent.

Methanol Content in Modified PVA

The methanol content in the modified PVA powders of Examples and Comparative Examples was determined by headspace gas chromatography, as follows.

Creation of Standard Curve

Three aqueous solutions of known methanol concentrations are prepared, using isopropyl alcohol as an internal standard. A standard curve is created by measuring these aqueous solutions with a gas chromatography device (GC-2010, Shimadzu Corporation) installed with a headspace sampler (Turbo Matrix HS40, Parkin Elmer)

Measurement of Methanol Content in Modified PVA Powder

Distilled water is taken into a 1,000 mL-graduated flask by filling it to a marked line, and 0.1 mL of isopropyl alcohol as an internal standard solution is added with a graduated pipette. The mixture is then thoroughly stirred. This solution will be called "solvent". Thereafter, 500 mg of modified PVA powder samples from Examples and Comparative Examples is weighed into a vial container for headspace gas chromatography measurement, and, after putting a stir bar, the solvent is charged into the vial container in a measured amount of 10 mL using a volumetric pipette. After placing and securely locking a cap on the vial container, the vial container is placed on a hot stirrer, and the modified PVA powder sample is dissolved under heat. The modified PVA powder is subjected to headspace gas chromatography measurement after visually confirming that the powder has completely dissolved. The methanol content of the modified PVA powder was determined from the standard curve previously created.

Content of Component Insoluble in 90° C., 5 Weight % Aqueous Solution

A 500-mL flask fitted with an agitator and a reflux condenser is placed in a 20° C. water bath, and 285 g of distilled water is charged into the flask, and stirred at 300 rpm. Thereafter, a weighed amount (15 g) of the modified PVA powders of Examples and Comparative Examples is gradually charged into the flask. As soon as all the modified PVA powder (15 g) is charged into the flask, the water bath temperature is increased to 90° C. over a time period of about 30 minutes to dissolve the modified PVA powder, and obtain a modified PVA solution. After the water bath temperature reaches 90° C., the modified PVA powder is further dissolved while stirring the mixture for 60 minutes at 300 rpm. The modified PVA solution is then filtered through a metal filter with 63-µm openings to trap undissolved remaining particles (undissolved particles). After filtration, the filter is thoroughly washed with 90° C. hot water to remove the modified PVA solution adhering to the filter. The filter with the remaining undissolved particles is then dried for 1 hour with a heating drier at 120° C. The weight of the undissolved particles is calculated by comparing the filter weight after drying with the weight of the filter before filtration. The calculated weight of the undissolved particles is the amount of components that are insoluble in the aqueous solution.

Particle Size Distribution

The modified PVA powders obtained in Examples and Comparative Examples were measured for particle size distribution, using the dry sieving method described in JIS Z 8815 (1994). The modified PVA powders obtained in Examples and Comparative Examples were sieved through a sieve (filter) with 1.00-mm openings, and the weight of the modified PVA powder having passed through the sieve was measured. The proportion (weight %) of the modified PVA particles having passed through the sieve was then calculated from the weight of the modified PVA powder before sieving. In a similar fashion, the modified PVA powders obtained in Examples and Comparative Examples were sieved through a sieve (filter) with 500-μm openings, and the weight of the modified PVA powder having passed through the sieve was measured, independently from the measurement using the sieve with 1.00-mm openings. The proportion (weight %) of the modified PVA particles having passed through the sieve was then calculated from the weight of the modified PVA powder before sieving. The opening complies with the nominal opening W of JIS Z 8801-1-2006.

Evaluation

Break Characteristic of Film

For evaluation, 4 weight % aqueous solutions of the modified PVA powders of Examples and Comparative Examples were prepared. The aqueous solutions were each cast and dried at 20° C. to obtain a coating 100 μm thick. The coating was cut into a size measuring 15 cm vertically and 2 cm horizontally to produce a test film (film). The test film was measured for tensile elongation 13 at 20° C. under 65% humidity at a rate of 100 mm/min, following JIS K 7127 (1999). The 4 weight % aqueous solution of the modified PVA powder was also filtered through a metal filter with 63-μm openings, and a test piece (film) was produced from a coating obtained from a filtrate after the removal of components insoluble in the aqueous solution. The test film was then measured for tensile elongation y, as above. The break characteristic α was rated according to the following criteria.

$$\text{Break characteristic } \alpha = \frac{\text{Tensile elongation } \beta \text{ of film before removal of insoluble components}}{\text{Tensile elongation } \gamma \text{ of film after removal of insoluble components}} \quad [\text{Math 1}]$$

A: $\alpha = 0.85$ or more

B: $\alpha = 0.75$ or more and less than 0.85

C: $\alpha =$ less than 0.75

Water Solubility of Film

The modified PVA powders of Examples and Comparative Examples were dissolved in solvent water, and glycerin was added to prepare 10 weight % modified PVA aqueous solutions containing 20 parts of glycerin with respect to 100 parts of the modified PVA powder. The aqueous solutions were each cast and dried at 20° C. to obtain a film 76 μm thick. The film was cut into a 40 mm×40 mm square, and placed in a slide mount. Separately, a 1-liter glass beaker charged with 1 liter of distilled water was installed in a constant-temperature bath that had been adjusted to 20° C., and the content was stirred at 250 rpm using a 5-cm rotor. After the distilled water in the beaker had reached 20° C., the slide mount was immersed in cold water being stirred, and the film was measured for water solubility. Here, the film was visually observed as it dissolved in water, and the time before the film fully dissolved was measured (in seconds). The film was rated "A" when the time to full dissolution was less than 100 seconds, "B" when the film needed 100 seconds or more and less than 300 seconds to fully dissolve, and "C" when the film did not fully dissolve in 300 seconds.

Percentage Yield of Pouch

The modified PVA powders of Examples and Comparative Examples were dissolved in solvent water, and glycerin was added to prepare 10 weight % modified PVA aqueous solutions containing 20 parts of glycerin with respect to 100 parts of the modified PVA powder. The aqueous solutions were each cast and dried at 20° C. to obtain a film 76 μm thick. The film was used to make 100 air-filled pouches using a film converter available from Cloud, and the percentage yield of pouch was determined using the following formula.

Percentage yield of pouch (%)=Number of pouches with no air leak(no pinholes)/100

The film was rated "A" when the percentage yield of pouch was 95% or more, "B" when the percentage yield of pouch was 80% or more and less than 95%, and "C" when the percentage yield of pouch was less than 80%.

Example 1

Copolymerization Step

For copolymerization, an apparatus was used that had a reflux condenser, a raw-material supply line, a reaction-solution eject line, a thermometer, a nitrogen inlet, and stirring vanes, together with a polymerization container (continuous polymerization device; hereinafter, "polymerization vessel") equipped with a reflux condenser, a raw-material supply line, a thermometer, a nitrogen inlet, and stirring vanes. Vinyl acetate (VAM; 656 L/hr), methanol (MeOH; 171 L/hr), a 20% methanol solution of monomethyl maleate (MMM) as a modifying species (101 L/hr), and a 2% methanol solution of 2,2'-azobis(4-methoxy-2,4-dimethylvaleronitrile) (AMV; 25 L/hr) were continuously supplied into the polymerization vessel using a metering pump. The polymerization solution was continuously ejected from the polymerization vessel in such a way as to maintain a certain liquid level in the polymerization vessel. The polymerization rate of vinyl acetate was adjusted to be 40% in the polymerization solution ejected from the polymerization vessel. The polymerization solution was retained in the polymerization vessel for 4 hours. The polymerization solution ejected from the polymerization vessel had a temperature of 63° C. The polymerization solution ejected from the polymerization vessel was exposed to methanol vapor to remove unreacted vinyl acetate, and obtain a methanol solution of vinyl ester copolymer (PVAc; 35 weight %).

Saponification Step, Washing Step, and Drying Step

Water and methanol were added in desired amounts to the methanol solution of vinyl ester copolymer to prepare a raw saponification solution, specifically, a 32 weight % vinyl ester copolymer/methanol solution containing 2 weight % of water. A 4 weight % sodium hydroxide/methanol solution (saponification catalyzing solution) was then added so that the molar ratio of sodium hydroxide to the vinyl acetate unit in the vinyl ester copolymer was 0.10. The raw saponification solution and the saponification catalyzing solution were mixed using a static mixer. The resulting mixture was placed on a belt, and kept under 40° C. temperature conditions for 18 minutes to promote saponification reaction.

The gel from the saponification reaction was pulverized, and impregnated with a washing solution having a methanol/methyl acetate ratio of 15/85 (volume ratio). The solution was then removed using a centrifugal dehydrator to obtain a modified vinyl alcohol polymer powder. The modified vinyl alcohol polymer powder (600 kg/hr; a resin component) was continuously supplied into a drier that had been adjusted to have a controlled inner temperature that brings the resin to 100° C. The powder was retained in the drier for 4 hours, on average. The powder was then pulverized to a size that passes through a filter with 1.00-mm openings, and the modified PVA powder of the present invention was obtained.

The modified PVA had a viscosity-average degree of polymerization of 1,200, and a degree of saponification of 94.0 mol %. The modifying contents (X) and (Y) were 4.0 mol % and 0.80 mol %, respectively, as measured by $^1$H-NMR spectral analysis, and the ratio (Y/X) was 0.20. The proportion of particles that passed through a filter with 1.00-mm openings was 99.0 weight %, and the proportion of particles that passed through a filter with 500-μm openings was 56.0 weight % with respect all particles of the modified PVA powder. The methanol content in the powder was calculated to be 2.3 weight % by headspace gas chromatography, and the content of components that were insoluble in the aqueous solution (content of water-insoluble components) was 100 ppm as measured by the method described above. The properties of the modified PVA powders are presented in Table 2, along with the evaluation results.

Examples 2 to 6, and Comparative Examples 1 to 13

Modified PVA powders were obtained using the same method used to produce the modified PVA powder of Example 1, except for the conditions shown in Tables 1 and 2. The properties of the modified PVA powders so obtained are presented in Table 2, along with the evaluation results.

Example 7

Water and methanol were added in desired amounts to the methanol solution of vinyl ester copolymer obtained in the copolymerization step of Example 1 to prepare a raw saponification solution, specifically, a 3 weight % vinyl ester copolymer (PVAc)/methanol solution containing 1.3 weight % of water. The solution was supplied to a reaction vessel equipped with a reflux condenser, a raw-material supply line, a thermometer, a nitrogen inlet, and stirring vanes, and was heated to 40° C. while being stirred at 300 rpm. A 4 weight % sodium hydroxide/methanol solution (saponification catalyzing solution) was then added so that the molar ratio of sodium hydroxide to the vinyl acetate unit in the vinyl ester copolymer was 0.10. The mixture was further stirred at 40° C. The particles started to deposit, and turned into a slurry after about 10 minutes from addition of sodium hydroxide. After 60 minutes, the slurry was dehydrated using a centrifugal dehydrator. The dehydrated particles were impregnated with methanol, and dehydrated again with the centrifugal dehydrator to obtain a modified vinyl alcohol polymer in particle form. The particulate modified vinyl alcohol polymer was continuously supplied into a drier that had been adjusted to have a controlled inner temperature that brings the resin to 90° C. The powder was retained in the drier for 4 hours, on average. This produced the modified PVA powder of the present invention. The modified PVA had a viscosity-average degree of polymerization of 1,200, and a degree of saponification of 96.0 mol %. The modifying contents (X) and (Y) were 4.0 mol % and 1.0 mol %, respectively, as measured by $^1$H-NMR spectral analysis, and the ratio (Y/X) was 0.25. The proportion of particles that passed through a filter with 1.00-mm openings was 99.5 weight %, and the proportion of particles that passed through a filter with 500-μm openings was 98.5 weight % with respect all particles of the modified PVA powder. The methanol content in the powder was calculated to be 0.9 weight % by headspace gas chromatography, and the content of components that were insoluble in the aqueous solution (content of water-insoluble components) was 20 ppm as measured by the method described above. The properties of the modified PVA powder are presented in Table 2, along with the evaluation results.

TABLE 1

| | | | | Polymerization conditions | | | | Saponification conditions | |
| --- | --- | --- | --- | --- | --- | --- | --- | --- | --- |
| | | | | Modifying species | | Polymerization | Retention | PVAc/ methanol | Water content of |
| | VAM (L/hr) | MeO (L/hr) | AMV (L/hr) | Species1) | Concentration (weight %) | rate (L/hr) | (%) | time (hr) | solution (weight %) | system (weight %) |
| Ex. 1 | 656 | 171 | 25 | MMM | 20 | 101 | 40 | 4 | 32 | 2.0 |
| Ex. 2 | 656 | 171 | 25 | MMM | 20 | 101 | 40 | 4 | 32 | 2.0 |
| Ex. 3 | 656 | 171 | 25 | MMM | 20 | 101 | 40 | 4 | 32 | 2.0 |
| Ex. 4 | 955 | 20 | 6 | MMM | 20 | 7 | 30 | 6 | 25 | 1.5 |
| Ex. 5 | 656 | 97 | 23 | DMM | 20 | 83 | 40 | 4 | 32 | 1.3 |
| Ex. 6 | 656 | 111 | 23 | MA | 20 | 67 | 40 | 4 | 32 | 1.3 |
| Ex. 7 | 656 | 171 | 25 | MMM | 20 | 101 | 40 | 4 | 3 | 1.3 |
| Com. Ex. 1 | 656 | 171 | 25 | MMM | 20 | 101 | 40 | 4 | 32 | 2.0 |
| Com. Ex. 2 | 656 | 171 | 25 | MMM | 20 | 101 | 40 | 4 | 32 | 2.0 |
| Com. Ex. 3 | 656 | 171 | 25 | MMM | 20 | 101 | 40 | 4 | 32 | 2.0 |
| Com. Ex. 4 | 656 | 171 | 25 | MMM | 20 | 101 | 40 | 4 | 32 | 2.0 |
| Com. Ex. 5 | 656 | 171 | 25 | MMM | 20 | 101 | 40 | 4 | 32 | 2.0 |
| Com. Ex. 6 | 656 | 171 | 25 | MMM | 20 | 101 | 40 | 4 | 32 | 2.0 |
| Com. Ex. 7 | 656 | 171 | 25 | MMM | 20 | 101 | 40 | 4 | 32 | 2.0 |
| Com. Ex. 8 | 750 | 83 | 20 | MMM | 20 | 313 | 35 | 4 | 30 | 1.5 |
| Com. Ex. 9 | 656 | 171 | 25 | MMM | 20 | 101 | 40 | 4 | 32 | 2.0 |
| Com. Ex. 10 | 656 | 171 | 25 | MMM | 20 | 101 | 40 | 4 | 32 | 2.0 |
| Com. Ex. 11 | 656 | 171 | 25 | MMM | 20 | 101 | 40 | 4 | 32 | 2.0 |
| Com. Ex. 12 | 656 | 171 | 25 | MMM | 20 | 101 | 40 | 4 | 32 | 2.0 |
| Com. Ex. 13 | 656 | 171 | 25 | MMM | 20 | 101 | 40 | 4 | 32 | 2.0 |

TABLE 1-continued

|  | | Saponification conditions | | Washing condition Composition of washing solution Methanol/methyl acetate (volume ratio) | Drying conditions | |
|---|---|---|---|---|---|---|
|  | | NaOH (molar ratio) | Neutralization with acetic acid | | Resin temp. (° C.) | Average retention time (hr) |
| | Ex. 1 | 0.10 | Absent | 15/85 | 100 | 4 |
| | Ex. 2 | 0.08 | Absent | 25/75 | 100 | 4 |
| | Ex. 3 | 0.06 | Absent | 25/75 | 95 | 6 |
| | Ex. 4 | 0.06 | Absent | 50/50 | 105 | 6 |
| | Ex. 5 | 0.008 | Absent | 35/65 | 105 | 4 |
| | Ex. 6 | 0.05 | Absent | 40/60 | 105 | 4 |
| | Ex. 7 | 0.10 | Absent | 100/0 | 90 | 4 |
| | Com. Ex. 1 | 0.10 | Absent | 25/75 | 100 | 4 |
| | Com. Ex. 2 | 0.10 | Absent | 25/75 | 110 | 4 |
| | Com. Ex. 3 | 0.08 | Absent | 100/0 | 100 | 4 |
| | Com. Ex. 4 | 0.08 | Absent | 100/0 | 120 | 4 |
| | Com. Ex. 5 | 0.08 | Absent | 60/40 | 100 | 4 |
| | Com. Ex. 6 | 0.08 | Present | 25/75 | 100 | 4 |
| | Com. Ex. 7 | 0.04 | Absent | 25/75 | 95 | 4 |
| | Com. Ex. 8 | 0.30 | Absent | 25/75 | 100 | 4 |
| | Com. Ex. 9 | 0.08 | Absent | EtOH 100 | 100 | 4 |
| | Com. Ex. 10 | 0.08 | Absent | EtOH 100 | 110 | 4 |
| | Com. Ex. 11 | 0.08 | Absent | n-PrOH 100 | 100 | 4 |
| | Com. Ex. 12 | 0.08 | Absent | n-PrOH 100 | 120 | 4 |
| | Com. Ex. 13 | 0.08 | Absent | 6.2% hydrous EtOH | 110 | 4 |

1)MMM: Monomethyl maleate DMM: Dimethyl maleate MA: Maleic anhydride

TABLE 2

| | Modified PVA powder | | | | | |
|---|---|---|---|---|---|---|
| | Degree of saponification (mol %) | Degree of polymerization | Modifying content (X) (mol %) | Modifying content (Y) (mol %) | Y/X | Methanol content (weight %) | Content of water-insoluble components (ppm) |
| Ex. 1 | 94.0 | 1200 | 4.0 | 0.80 | 0.20 | 2.3 | 100 |
| Ex. 2 | 90.0 | 1200 | 4.0 | 0.40 | 0.10 | 1.8 | 300 |
| Ex. 3 | 84.0 | 1200 | 4.0 | 0.24 | 0.06 | 1.5 | 600 |
| Ex. 4 | 88.0 | 3500 | 0.4 | 0.03 | 0.08 | 1.3 | 1200 |
| Ex. 5 | 88.0 | 1500 | 3.0 | 0.15 | 0.05 | 2.6 | 1800 |
| Ex. 6 | 88.0 | 1500 | 3.0 | 0.18 | 0.06 | 2.0 | 1000 |
| Ex. 7 | 96.0 | 1200 | 4.0 | 1.00 | 0.25 | 0.9 | 20 |
| Com. Ex. 1 | 90.0 | 1200 | 4.0 | 0.42 | 0.11 | 3.4 | 400 |
| Com. Ex. 2 | 90.0 | 1200 | 4.0 | 0.19 | 0.05 | 2.5 | 2200 |
| Com. Ex. 3 | 90.0 | 1200 | 4.0 | 0.44 | 0.11 | 5.2 | 100 |
| Com. Ex. 4 | 90.0 | 1200 | 4.0 | 0.15 | 0.04 | 2.4 | 4200 |
| Com. Ex. 5 | 90.0 | 1200 | 4.0 | 0.20 | 0.05 | 3.2 | 1900 |
| Com. Ex. 6 | 90.0 | 1200 | 4.0 | 0.18 | 0.05 | 2.3 | 2000 |
| Com. Ex. 7 | 75.0 | 1200 | 4.0 | 0.10 | 0.03 | 2.9 | 3200 |
| Com. Ex. 8 | 84.0 | 1200 | 12.0 | 0.55 | 0.05 | 2.5 | 3000 |
| Com. Ex. 9 | Sample has ethanol odor after drying | | | | | | |
| Com. Ex. 10 | 90.0 | 1200 | 4.0 | 0.18 | 0.05 | 0.7 | 2500 |
| Com. Ex. 11 | Sample has propanol odor after drying | | | | | | |
| Com. Ex. 12 | 90.0 | 1200 | 4.0 | 0.17 | 0.04 | 0.8 | 3500 |
| Com. Ex. 13 | Fused inside drier; not releasable | | | | | | |

| | Modified PVA powder | | Evaluation |
|---|---|---|---|
| | Particle size distribution | | |
| | Particles passing through a sieve with 1.00-mm openings (weight %) | Particles passing through a seive with 500-μm openings (weight %) | Break characteristic of film |
| Ex. 1 | 99.0 | 56.0 | A |
| Ex. 2 | 99.0 | 56.0 | A |
| Ex. 3 | 99.0 | 56.0 | A |
| Ex. 4 | 97.0 | 49.0 | B |
| Ex. 5 | 96.0 | 44.0 | B |
| Ex. 6 | 95.0 | 39.0 | B |
| Ex. 7 | 99.5 | 98.5 | A |

TABLE 2-continued

| | | | |
|---|---|---|---|
| Com. Ex. 1 | 73.0 | 3.5 | A |
| Com. Ex. 2 | 73.0 | 3.5 | C |
| Com. Ex. 3 | 99.0 | 56.0 | A |
| Com. Ex. 4 | 99.0 | 56.0 | C |
| Com. Ex. 5 | 99.0 | 56.0 | B |
| Com. Ex. 6 | 99.0 | 56.0 | C |
| Com. Ex. 7 | 99.0 | 56.0 | C |
| Com. Ex. 8 | 99.0 | 56.0 | C |
| Com. Ex. 9 | 99.0 | 56.0 | — |
| Com. Ex. 10 | 99.0 | 56.0 | C |
| Com. Ex. 11 | 99.0 | 56.0 | — |
| Com. Ex. 12 | 99.0 | 56.0 | C |
| Com. Ex. 13 | — | — | — |

In Comparative Examples 1 and 2, the proportion of particles that passed through a sieve with 1.00-mm openings was less than 95 weight % of all particles. In Comparative Examples 3 to 5, the methyl acetate content in the washing solution used before drying was less than 50 volume %. That is, none of the modified PVA powders had a methanol content of less than 3.0 weight %, and contained less than 2,000 ppm of components insoluble in the aqueous solution.

Comparative Example 6 involved neutralization with acetic acid used as a catalyst of intermolecular esterification, before drying. In Comparative Example 7, the degree of saponification was less than 80.0 mol %. In Comparative Example 8, the content of the structural unit of the ethylenically unsaturated carboxylic acid exceeded 10 mol %. That is, none of the modified PVA powders contained less than 2,000 ppm of components insoluble in the aqueous solution.

In Comparative Examples 9, 10, 11, and 12, the samples were impregnated with ethanol or propanol before drying by following the method described in Patent Literature 3. Because this requires higher-than-normal heat, it was not possible to sufficiently dry the samples with a drying temperature of 100° C., and the resulting modified PVA powder had an ethanol or propanol odor, suggesting that removal of the organic solvent was insufficient. With a drying temperature of 110° C. or more, the amount of components insoluble in the aqueous solution exceeded 2,000 ppm.

In Comparative Example 13, the sample was impregnated with 6.2% hydrous ethanol before drying by following the method described in Patent Literature 3. However, the modified PVA fused inside the drier, making it impossible to continuously eject it from the drier.

The modified PVA powders of Table 2 were used to produce films and pouches, and these were evaluated for water solubility of the film, and percentage yield of the pouch produced. The results are presented in Table 3.

TABLE 3

| | Evaluation | |
|---|---|---|
| | Water solubility of film | Pouch yield |
| Ex. 1 | A | A |
| Ex. 2 | A | B |
| Ex. 3 | A | B |
| Ex. 6 | A | B |
| Ex. 7 | A | A |
| Com. Ex. 2 | A | C |
| Com. Ex. 4 | A | C |
| Com. Ex. 5 | A | C |
| Com. Ex. 6 | A | C |
| Com. Ex. 7 | A | C |
| Com. Ex. 8 | A | C |
| Com. Ex. 10 | A | C |
| Com. Ex. 12 | A | C |

As can be seen from the results shown in Table 3, the films produced from the modified PVA powders of Examples 1, 2, 3, 6, and 7 had high water solubility, and the percentage yield of the pouch was high. In contrast, the films produced from the modified PVA powders of Comparative Examples 2, 4 to 8, and 10 and 12 had considerably lower pouch yields, though water solubility was desirable.

INDUSTRIAL APPLICABILITY

A modified vinyl alcohol polymer powder of the present invention has a reduced methanol content, and contains a trace amount of components that are insoluble in an aqueous solution. This makes the modified vinyl alcohol polymer powder industrially useful. A film produced from a modified vinyl alcohol polymer powder of the present invention has high solubility in water, and involves few defects when used to produce packaging materials such as a pouch. The film is therefore useful as a waterproof coating, and as a packaging film for food products, agrichemicals, laundry detergents, and industrial chemicals.

The invention claimed is:

1. A modified vinyl alcohol polymer powder, comprising:
 a structural unit derived from a derivative (A) of an ethylenically unsaturated dicarboxylic acid in a content (X) of 0.05 mol % or more and 10 mol % or less, and having a degree of saponification of 80.0 mol % or more and 99.9 mol % or less,
 wherein the modified vinyl alcohol polymer powder has a methanol content of 0.01 weight % or more and less than 3.0 weight % as measured by headspace gas chromatography of 500 mg of the polymer powder,
 the modified vinyl alcohol polymer powder comprises 0.1 ppm or more and less than 2,000 ppm of a component that is insoluble in a 90° C., 5 weight % aqueous solution, and
 at least 95 weight % of all particles of the modified vinyl alcohol polymer powder pass through a sieve with 1.00 mm openings.

2. The modified vinyl alcohol polymer powder according to claim 1, wherein the derivative (A) of an ethylenically unsaturated dicarboxylic acid is a monoester, a diester, or an anhydride of an ethylenically unsaturated dicarboxylic acid.

3. The modified vinyl alcohol polymer powder according to claim 1, wherein the derivative (A) of an ethylenically unsaturated dicarboxylic acid comprises a maleic acid monoalkyl ester, a maleic acid dialkyl ester, maleic anhydride, a fumaric acid monoalkyl ester, or a fumaric acid dialkyl ester.

4. The modified vinyl alcohol polymer powder according to claim 1, wherein at least a part of the structural unit derived from the derivative (A) of an ethylenically unsaturated dicarboxylic acid is a structural unit represented by formula (I):

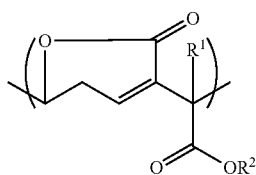

(I)

wherein $R^1$ is a hydrogen atom, or a linear or branched alkyl group of 1 to 8 carbon atoms, and
$R^2$ is a metal atom, a hydrogen atom, or a linear or branched alkyl group of 1 to 8 carbon atoms, and
the modified vinyl alcohol polymer powder satisfies formula (Q):

$$0.05 \leq Y/X < 0.98 \qquad (Q),$$

wherein X is the content of the structural unit derived from the derivative (A) of an ethylenically unsaturated dicarboxylic acid, and
Y is the content of the structural unit represented by formula (I).

5. The modified vinyl alcohol polymer powder according to claim 1, wherein at least 30 weight % of all particles of the modified vinyl alcohol polymer powder pass through a sieve with 500 µm-openings.

6. A method for producing the modified vinyl alcohol polymer powder of claim 1, the method comprising:
 obtaining a vinyl ester copolymer (C) through copolymerization of the derivative (A) of an ethylenically unsaturated dicarboxylic acid with a vinyl ester monomer (B);
 saponifying the vinyl ester copolymer (C) with an alkali catalyst in a methanol solvent; and
 impregnating the saponified polymer with a washing solution comprising 45 volume % or more of methyl acetate.

7. The method according to claim 6, wherein a solution prepared to comprise more than 20 weight % of the vinyl ester copolymer (C) is mixed with the alkali catalyst in the saponifying, and a resulting semi-solid or solid product is pulverized with a pulverizer.

8. The method according to claim 6, wherein the saponifying does not involve neutralization with an acid.

9. A method for producing the modified vinyl alcohol polymer powder of claim 1, the method comprising:
 obtaining a vinyl ester copolymer (C) through copolymerization of the derivative (A) of an ethylenically unsaturated dicarboxylic acid with a vinyl ester monomer (B); and
 saponifying the vinyl ester copolymer (C) with an alkali catalyst in a methanol solvent,
 the vinyl ester copolymer (C) having a concentration of less than 10 weight % in the methanol solvent in the saponifying.

10. A water-soluble film, comprising the modified vinyl alcohol polymer powder of claim 1.

11. The water-soluble film of claim 10, wherein the water-soluble film further comprises a plasticizer.

12. The water-soluble film of claim 10, wherein the water-soluble film further comprises a surfactant.

13. A packaging material, comprising a chemical packed in the water-soluble film of claim 10.

14. The packaging material of claim 13, wherein the chemical is an agrichemical or a detergent.

\* \* \* \* \*